(12) United States Patent
Lechner et al.

(10) Patent No.: US 7,874,595 B2
(45) Date of Patent: Jan. 25, 2011

(54) PLUG-IN CONNECTOR FOR MEDIUM CONDUITS

(75) Inventors: Martin Lechner, Lindlar (DE); Frank Zenses, Hürth (DE); Marco Isenburg, Ratingen (DE)

(73) Assignee: Voss Automotive GmbH, Wipperfurth (DE)

( * ) Notice: Subject to any disclaimer, the term of this patent is extended or adjusted under 35 U.S.C. 154(b) by 186 days.

(21) Appl. No.: 12/089,743

(22) PCT Filed: Aug. 23, 2006

(86) PCT No.: PCT/EP2006/065603

§ 371 (c)(1),
(2), (4) Date: Jun. 12, 2008

(87) PCT Pub. No.: WO2007/042344

PCT Pub. Date: Apr. 19, 2007

(65) Prior Publication Data
US 2008/0252071 A1     Oct. 16, 2008

(30) Foreign Application Priority Data
Oct. 10, 2005     (DE) .................. 20 2005 015 966 U

(51) Int. Cl.
*F16L 37/00* (2006.01)
(52) U.S. Cl. .......................................... 285/305; 285/81
(58) Field of Classification Search ............ 285/81, 285/86, 305, 313, 319
See application file for complete search history.

(56) References Cited
U.S. PATENT DOCUMENTS

| | | | | |
|---|---|---|---|---|
| 764,395 A * | 7/1904 | Sweed et al. | ................. | 285/319 |
| 1,966,718 A * | 7/1934 | Hanson | ....................... | 285/313 |
| 2,004,967 A * | 6/1935 | Williams | ..................... | 285/317 |
| 3,711,125 A * | 1/1973 | Dehar | .......................... | 285/111 |
| 3,826,523 A * | 7/1974 | Eschbaugh | ................... | 285/319 |
| 4,332,402 A * | 6/1982 | Shellhause | ................... | 285/86 |
| 4,852,563 A * | 8/1989 | Gross | .......................... | 285/305 |
| 4,875,711 A * | 10/1989 | Watanabe | ................... | 285/319 |
| 5,029,904 A * | 7/1991 | Hunt | .......................... | 285/319 |
| 5,806,898 A | 9/1998 | Hollnagle et al. | | |
| 5,988,706 A | 11/1999 | Hollnagel et al. | | |
| 6,471,252 B1 * | 10/2002 | Moretti et al. | ............. | 285/319 |
| 6,499,772 B1 * | 12/2002 | Minemyer | ................... | 285/319 |
| 6,505,866 B1 * | 1/2003 | Nakamura et al. | .......... | 285/239 |
| 6,679,528 B1 * | 1/2004 | Poder | ......................... | 285/305 |
| 6,834,888 B2 * | 12/2004 | Campau | ...................... | 285/81 |

(Continued)

FOREIGN PATENT DOCUMENTS

DE         37 10 853 A1     10/1988

(Continued)

*Primary Examiner*—David E Bochna
(74) *Attorney, Agent, or Firm*—Brinks Hofer Gilson & Lione

(57) ABSTRACT

The invention provides for a plug-in connector (1) for medium conduits comprising a plug-in part (4) sealingly introducible by a plug shank (6) into the receiving opening (16) of a connector counterpart (2) which is sealingly closable by latching means (18) for preventing the pull out thereof. For this purpose, a locking element (34) is movably connected to the plug-in part (4) in such a way that it locks the latching means (18) in a safety unscrewing-preventing position and releases in the unscrewing position for carrying out an unscrewing movement for freeing from locking.

18 Claims, 9 Drawing Sheets

U.S. PATENT DOCUMENTS

| | | |
|---|---|---|
| 6,857,663 B2 | 2/2005 | Nagata et al. |
| 7,316,428 B2 * | 1/2008 | Takayanagi et al. ......... 285/319 |
| 7,481,463 B2 * | 1/2009 | Ishida et al. ................ 285/305 |
| 7,658,420 B2 * | 2/2010 | Harger et al. ................. 285/86 |
| 2003/0132631 A1 | 7/2003 | Nagata et al. |

FOREIGN PATENT DOCUMENTS

| | | |
|---|---|---|
| DE | 29 82 4260 U1 | 12/2000 |
| DE | 100 47 872 A1 | 10/2001 |
| EP | 0 999 398 B1 | 12/2002 |

* cited by examiner

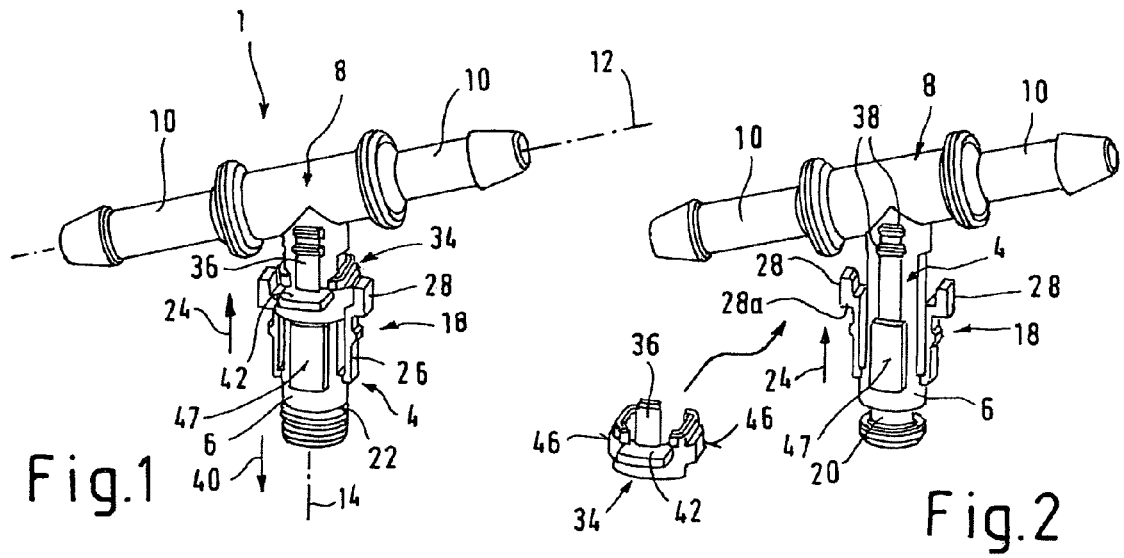
Fig.1  Fig.2
Fig.4  Fig.3
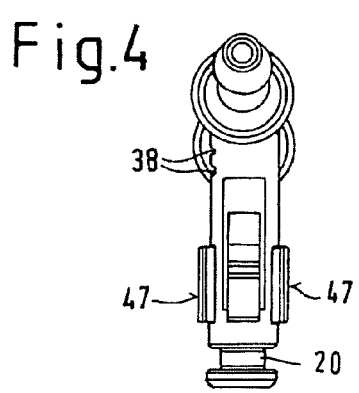 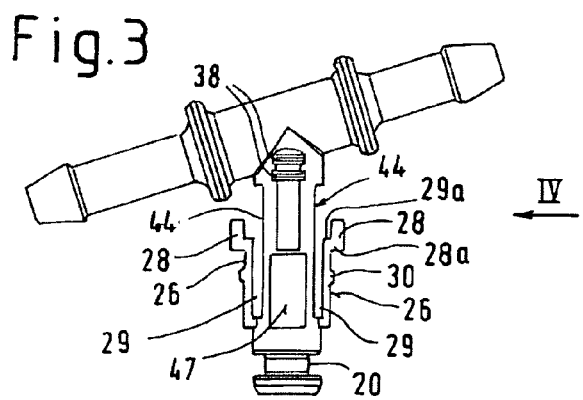
Fig.6  Fig.5
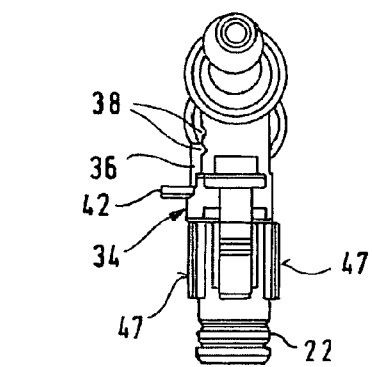 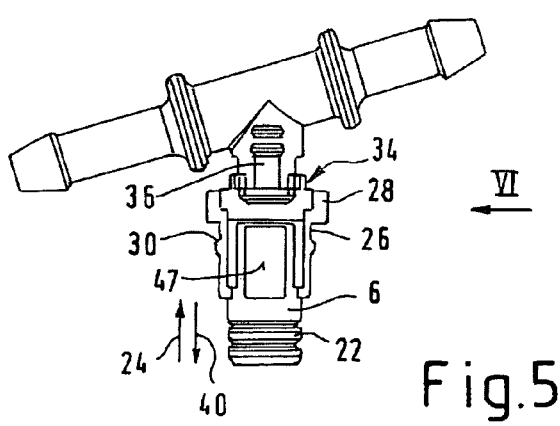

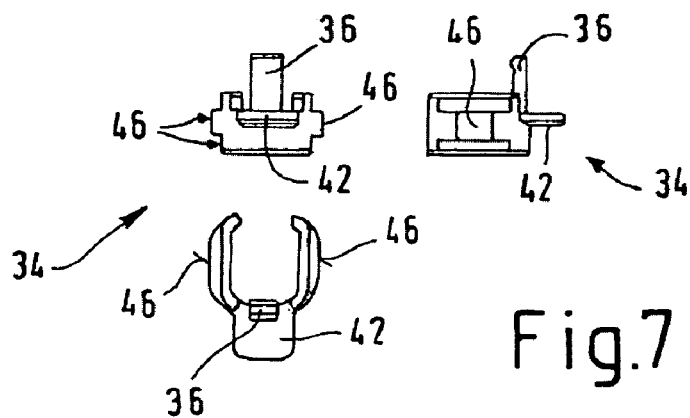
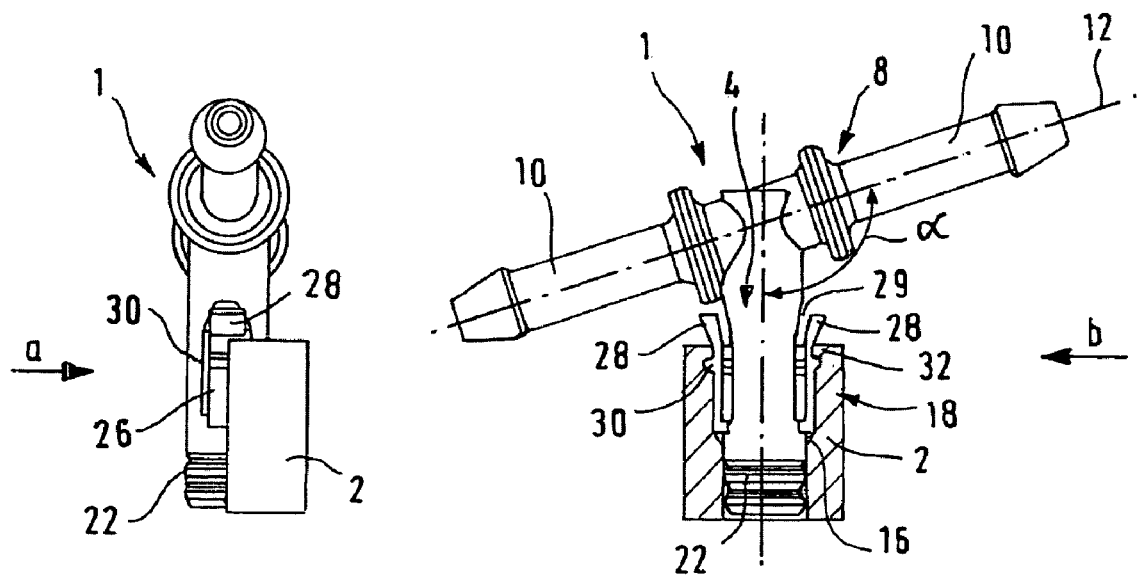
Fig.7
Fig.8b  Fig.8a

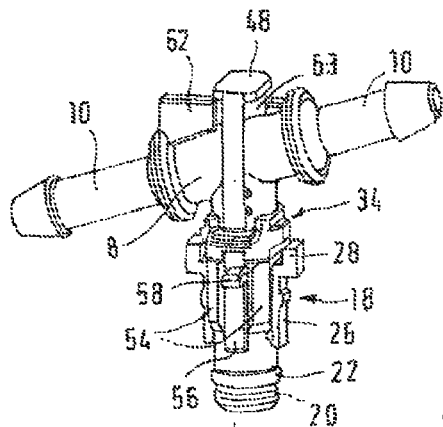
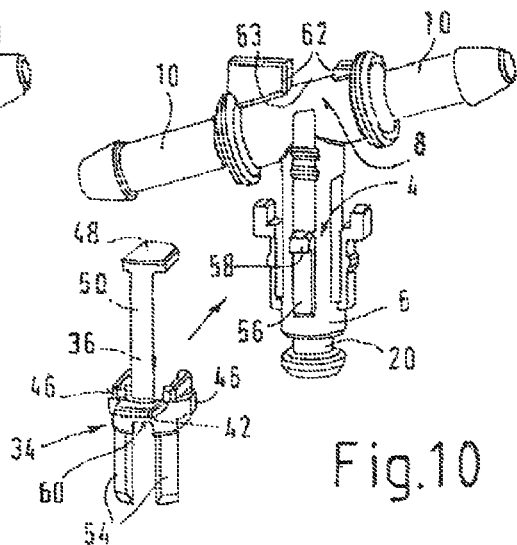
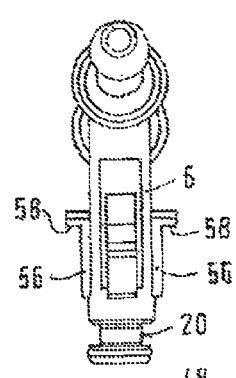
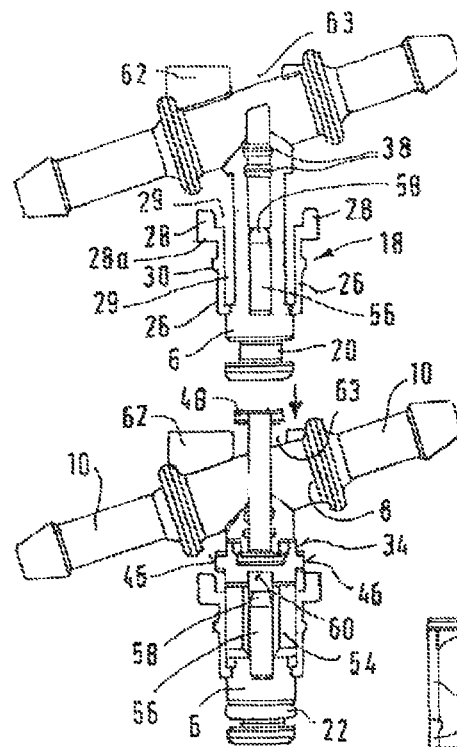
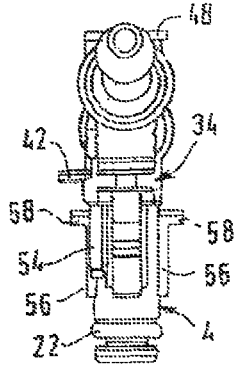
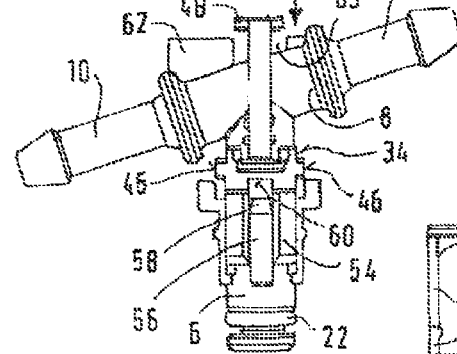
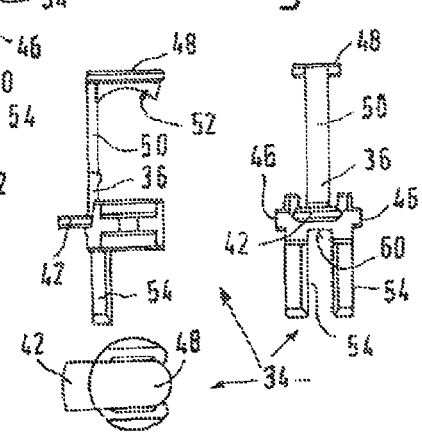

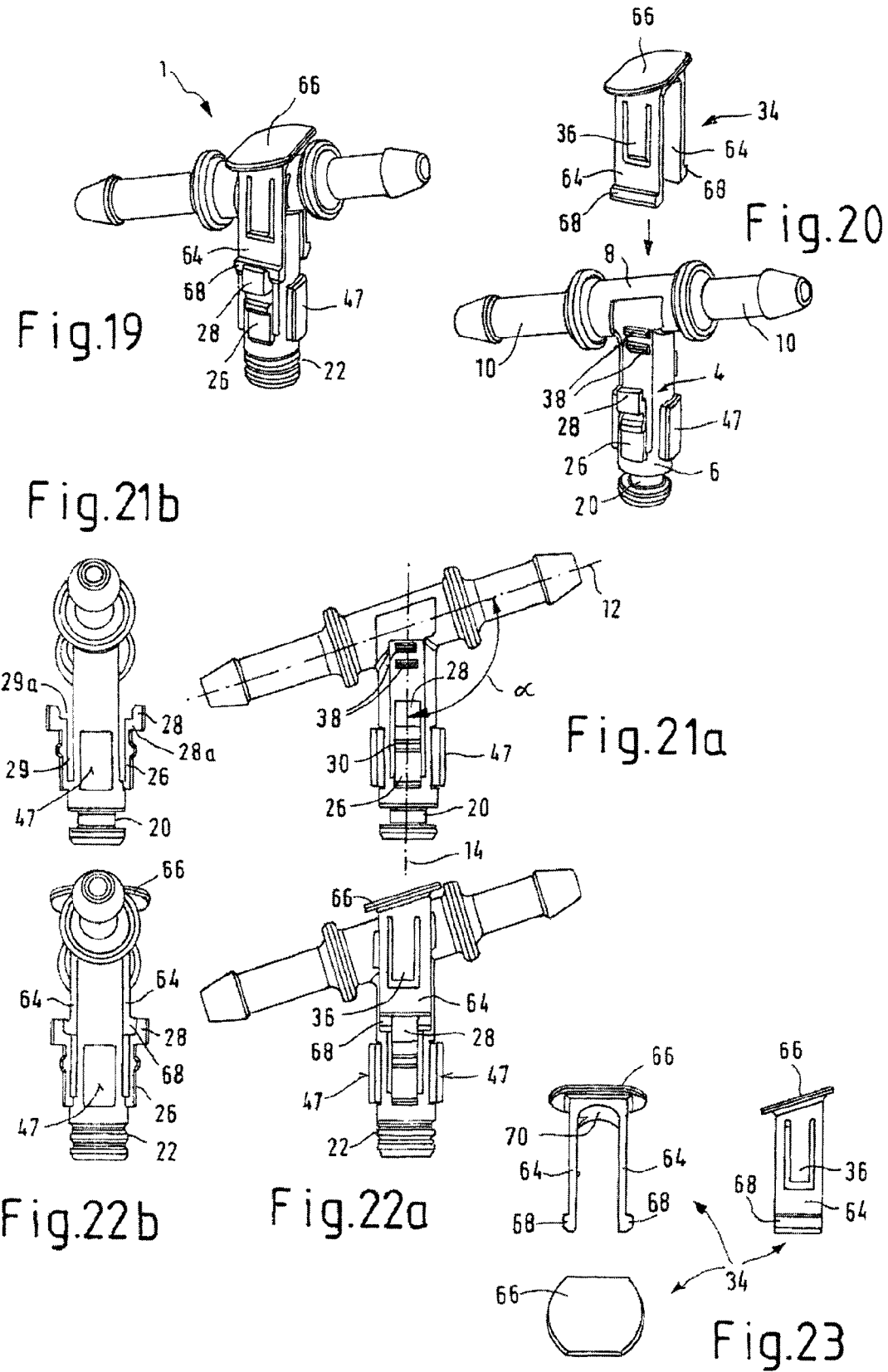

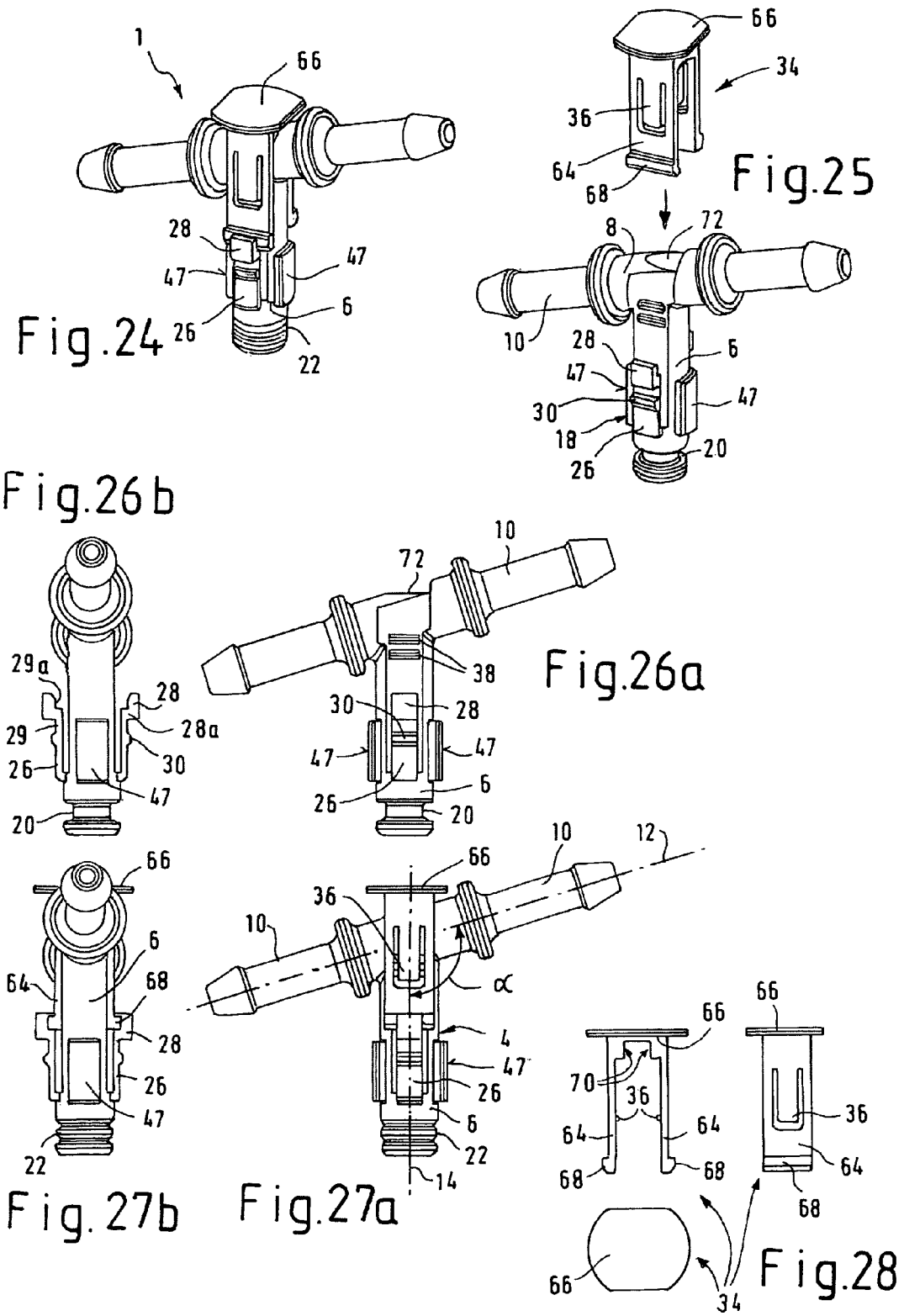

PLUG-IN CONNECTOR FOR MEDIUM CONDUITS

CROSS REFERENCE TO RELATED APPLICATIONS

This application claims priority to PCT international patent application number PCT/EP2006/065603, filed Aug. 23, 2006 and DE patent application 20 2005 015 966.2, filed Oct. 10, 2005.

STATEMENT REGARDING FEDERALLY SPONSORED RESEARCH OR DEVELOPMENT.

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The present invention relates to a plug-in connector for media conduits (pipelines or hose lines for hydraulic or pneumatic flow media), in particular for fuel lines, according to the preamble of claim 1.

BACKGROUND OF THE INVENTION

DE 298 24 260 U1 and the corresponding EP 0 999 398 B1 describes such a plug-in connector of the generic type in which the plug-in part has, as latching means, two latching arms which are formed integrally in one piece. The latching arms extend on diametrically opposite sides of the plug-in part with their free radially elastically moveable ends, in each case approximately parallel to the plugging axis in the direction opposed to the plug-in direction, i.e. in the release direction. When plugging in occurs, the latching arms engage with radial latching shoulders in corresponding latching contours within the receiving opening of the connector counterpart, an end activation section projecting outward from the receiving opening in each case so that the latching arms can be moved radially inward manually in order to release the latched connection. In this context, there is a description of a protective cap which can be plugged over the plug-in region from the outside in order to provide a seal against dirt. In addition, the protective cap also prevents undesired release of the plug-in part because, before the release activation of the latching arms, the protective cap firstly has to be removed because otherwise the latching arms or their activation sections are not accessible. This known embodiment requires a relatively large amount of installation space, and the protective cap is, as a separate part, subject to a considerable risk of being lost.

U.S. Pat. No. 5,988,706 A describes a pipe which can be plugged with one end into a receiving part. In order to secure the pipe, it has an upset radial annular bead against which a securing element, seated on the pipe and composed of sheet metal, acts. This securing element is composed of an annular part which surrounds the pipe and two spring elastic latching arms which are located diametrically opposite one another and engage behind a step within the receiving part. In order to secure against release, a further hollow cylindrical ring is additionally arranged in a displaceable fashion on the pipe. This ring can be pushed axially into the region of the securing element.

A very similar design is described in U.S. Pat. No. 5,806,898 A, in which case a profiled ring body is provided for securing purposes.

DE 37 10 853 A1 describes a plug-in connection for a pipe. In this context, a receiving part has a cylindrical annular space into which the pipe and a securing sleeve which surrounds it and is made of plastic can be introduced.

Finally, US 2003/0132631 A1 describes a further pipe connection with a sleeve-shaped securing element and a cap-like securing element composed of an elastic material. This securing element is specifically embodied in such a way that it can be fitted onto an angular region of the pipe.

SUMMARY OF THE INVENTION

The present invention is based on the object of providing a plug-in connector of the type mentioned at the beginning, which plug-in connector is distinguished by a particularly compact design, good handling with a low space requirement for manual release activation and by easy manufacture and assembly.

According to the invention, this is achieved by means of the features of claim 1. Advantageous embodiments are the subject matter of the dependent claims and of the following description.

Accordingly, a locking element is captively and moveably connected to the plug-in part in such a way that in a secured position it blocks the latching means to prevent release, and in a release position it releases said latching means for a release movement which cancels the locked arrangement. The locking element expediently surrounds the plug-in part or its plug shank in certain areas, and can move radially between the plug shank and the latching arms or their activation sections in certain areas. In this secured position, the latching arms are blocked preventing a release movement which is directed radially inward. The plug-in connector according to the invention has a very compact shape due to its embodiment, in particular due to the arrangement and operative connection of the locking element to the plug-in part, and it ensures a high level of securing against undesired release accompanied by good handling.

BRIEF DESCRIPTION OF THE DRAWINGS

The invention will now be explained in more detail in a number of preferred variants of the locking element by means of a plurality of exemplary embodiments which are illustrated in the drawing, in which:

FIG. 1 is a perspective view of a first embodiment of a plug-in connector according to the invention with a locking element in a secured position, FIG. 2 is an exploded view with a locking element illustrated at a distance, FIG. 3 is a side view of the connector without a locking element, FIG. 4 is a side view in the direction IV of the arrow as per FIG. 3, FIGS. 5 & 6 are views, analogous to FIGS. 3 and 4, of the entire plug-in connector according to FIG. 1 connected to the locking element, FIG. 7 is a three-view representation of the locking element of the first embodiment according to FIGS. 1 to 6, FIG. 8 comprises two views, analogous to FIGS. 5 and 6, in an embodiment variant and with additional representation, cut in half, of a connector counterpart, FIGS. 9 to 13 show representations of a second embodiment of the plug-in connector according to the invention, analogous to FIGS. 1 to 7, FIGS. 14 to 18 show further representations of a third embodiment, analogous to FIGS. 9 to 13, FIGS. 19 to 23 show a fourth embodiment in representations analogous to FIGS. 14 to 18, FIGS. 24 to 28 show further analogous representations of a fifth embodiment which is modified slightly compared to FIGS. 19 to 23, FIGS. 29 to 36 show representations of a further, preferred embodiment of the invention, specifically:

DETAILED DESCRIPTION

Figure 14:
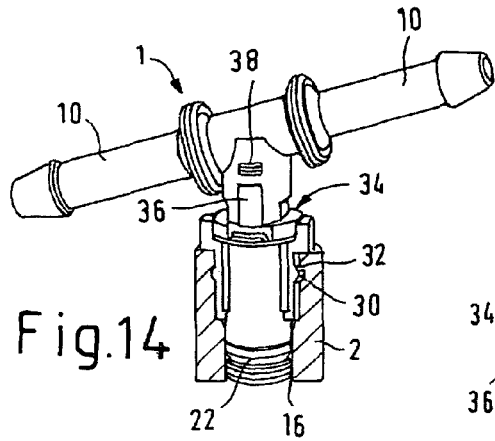
Figure 15:
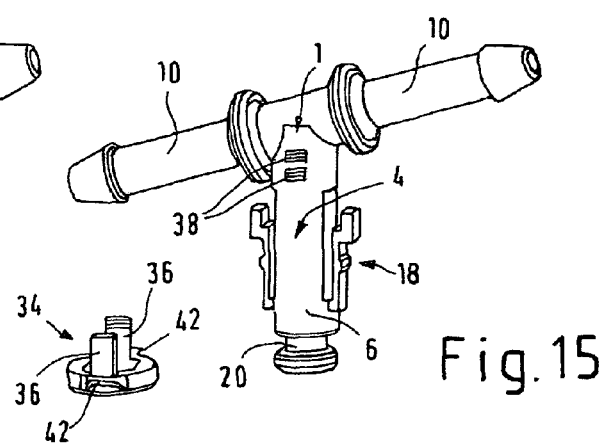
Figure 16B:
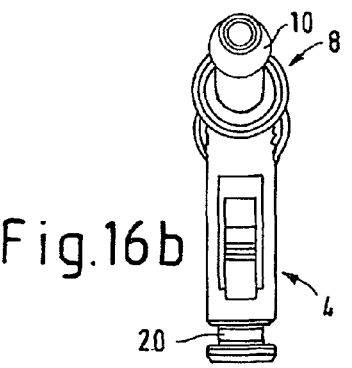
Figure 16A:
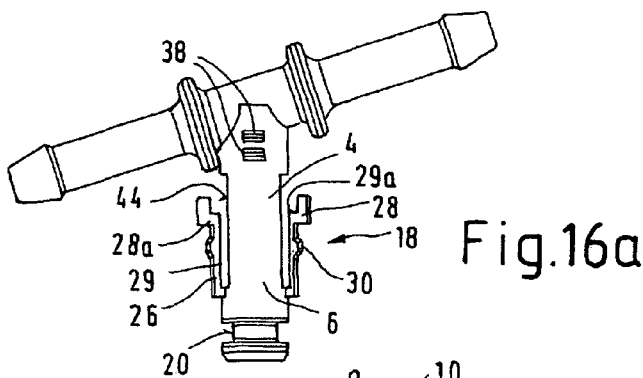
Figure 17B:
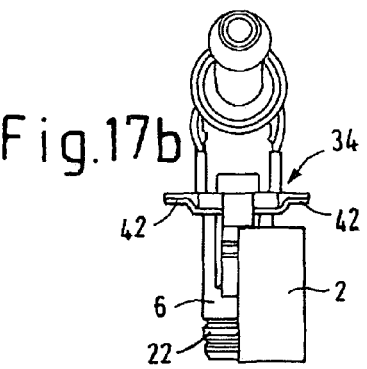
Figure 17A:
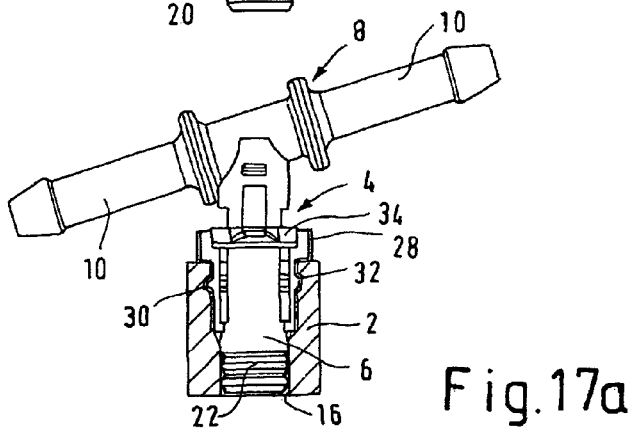
Figure 18:
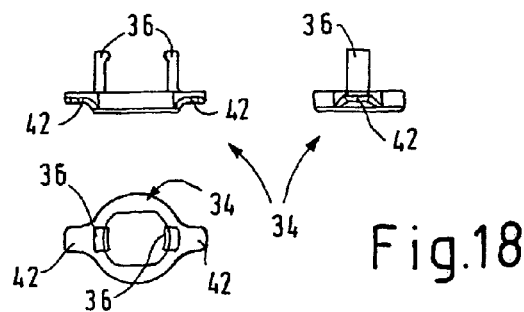

In the various figures of the drawing, identical parts are always provided with the same reference symbols.

Figure 29:
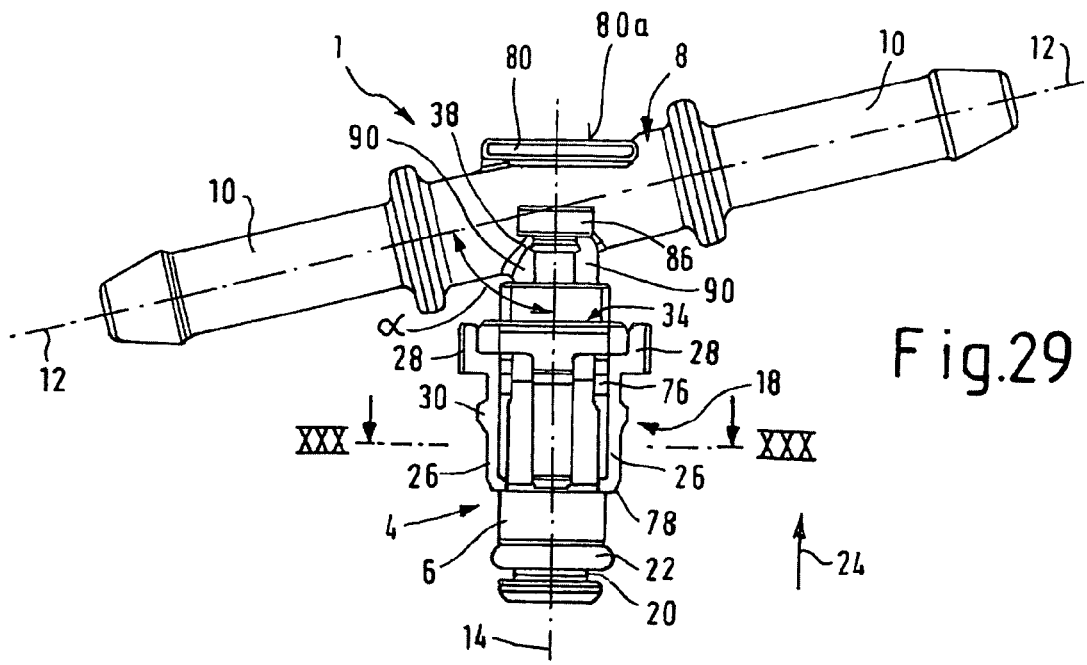
FIG. 29 is a side view of the plug-in part in the secured position of the locking element.

A plug-in connector 1 according to the invention is used to connect at least one media conduit (not illustrated) to a connector counterpart 2 in a rapid and releasable, pluggable and latchable fashion (see FIGS. 8, 14, 17, 34 and 35). The plug-in connector 1 is composed of a plug-in part or plug-in section 4 in the form of a plug shank 6 and a conduit connection section 8 with at least one conduit outlet 10. In the illustrated embodiments, the plug-in connector 1 is embodied as a T connector, with two conduit outlets 10 extending in opposite directions on the same axis, i.e. in accordance with a common conduit axis 12. However, it is also possible for there to be two or more conduit outlets 10 with different conduit axes. The plug shank 6 defines a plugging axis 14, with the conduit axis 12 extending transversely with respect to the plugging axis 14. In this context it is possible, as in the illustrated preferred embodiments (cf. for example FIGS. 8 and 29), for the plugging axis 14 and the conduit axis 12 to enclose an angle $\alpha \neq 90°$. An embodiment where $\alpha = 90°$ is however also possible. In addition, it is optionally also possible for there to be just one conduit outlet 10 which is oriented transversely with respect to the plugging axis 14. In addition, it is also possible, at least in the embodiments according to FIGS. 1 to 8 and 14 to 18, for (just) one conduit outlet which is located opposite the plug shank 6 to be oriented in the direction of the plugging axis 14 (not illustrated). The conduit outlets 10 can be embodied as connectors for plugging on a respective conduit (not illustrated).

According to FIGS. 8, 14, 17, 34 and 35, the plug shank 6 can be plugged in a seal-forming fashion into a receiving opening 16 of the connector counterpart 2, and can be releasably locked, using latching means 18, to prevent it from being pulled out. For the seal, the plug shank 6 is fitted with at least one sealing ring 22 in an annular groove 20.

The latching means 18 are preferably composed of two latching arms 26 which are located diametrically opposite one another, extend approximately parallel to the plugging axis 14 in the release direction (arrow 24), can move in a spring elastic fashion in the radial direction and are integrally connected at one end to the plug shank 6. However, alternatively, a single latching arm 26 may already suffice, specifically in particular in applications of the plug-in connector 1 for pressureless media or in the event of a partial vacuum. However, it is also possible to provide more than two (for example three) latching arms 26 in a preferably radially symmetrical circumferential distribution. At their free ends which are located opposite one another and point in the release direction 24, the latching arms 26 have end sections 28 which, in the plugged state (see for example FIGS. 8 and 35), protrude outside the connector counterpart 2. Each end section 28 is preferably connected to the associated latching arm 26 via a radial web section 28a in such a way that a radial gap 29 which is formed between the plug shank 6 and the latching arm 26 merges with a radially enlarged gap region 29a between the plug shank 6 and the end section 28 (see in particular FIGS. 3, 11, 16, 21, 26 and 35). In the plugged-in state, the latching arms 26 engage in a positively locking, or at least frictionally locking, fashion behind a latching step 32 which is provided within the receiving opening 16 of the connector counterpart 2 (see in particular FIG. 35). In order to release this latched connection, the latching arms 26 can be moved radially inward manually by means of the protruding end sections 28 in order to release a positively locking latched connection. In the case of a frictionally locking latched connection by means of faces which are beveled with respect to the plugging axis 14 (see FIG. 35), the plug shank 6 can also simply be pulled out of the receiving opening 16 in a latching fashion. In this context, the latching means 18 can also be configured with different oblique faces in such a way that different forces have to be overcome in the plugging-in direction and the release direction. The plugging in will preferably be easier than the release, but the converse is also possible. This is described in more detail below for the embodiment according to FIGS. 29 to 36 with reference to FIG. 35.

The plug-in connector 1 is expediently embodied with its components, i.e. with the plug-in section 4, with the latching arms 26 and preferably also with the conduit connection section 8, as an integral, monolithic shaped part, in particular made of plastic.

According to the invention, a locking element 34 is connected to the plug-in part 4 in a positively locking or frictionally locking fashion and as a result largely captively, and is connected so that it moves between a release position and a secured position in such a way that in the secured position, cf. for example FIGS. 1, 5 and 6 and FIGS. 29, 33 and 36, it blocks the latching means 18 to prevent release, and in the release position, cf. FIGS. 9 and 12 and FIGS. 32, 34 and 35, it releases said latching means 18 for a release movement which cancels the locked arrangement. The locking element 34 is preferably held on the plug-in part 4 so as to be moveable (slideable) in the axial direction in such a way that in the secured position it engages radially in the gap region 29a, and preferably also partially in the gap 29 between the latching arms 26 and the plug shank 6, that as a result the latching arms 26 are blocked to prevent a release movement which is directed radially inward. In the release position, the locking element 34 is axially outside (above) the gap region 29, 29a of the latching arms 26 and their end sections 28 in such a way that the latching arms 26 are released for their radial release movement. In this context, the locking element 34 is expediently secured in each of the two positions, in particular in a frictionally locking and latching fashion in relation to the plug-in part 4.

Different embodiment variants of the locking element 34 are explained below.

In the first embodiment according to FIGS. 1 to 7, the locking element 34, viewed in plan view and in the circumferential direction of the plug shank 6, is embodied approximately in a C shape and preferably from plastic so that it can be slid radially onto the plug shank 6 and engages there around the plug shank 6 and as a result is guided in a self-locking and axially moveable fashion. A latching element 36 in the form of a latching arm which extends axially in the release direction 24 is provided diametrically opposite the opening region of the C-shaped locking element 34. This latching element 36 interacts with two latching grooves 38, spaced axially apart, on the plug shank 6 in such a way that the locking element 34 is secured in a latching fashion in the secured position and in the release position, respectively. An activation element 42 with a preferably rectangular shape is arranged in the plugging-in direction (arrow 40) underneath the latching element 36. A force for moving the locking element 34 axially can be exerted manually or with a suitable tool using this clip-like, approximately radially protruding activation element 42. In this context, the locking element 34 is guided in a slideable fashion on guide faces 44 (FIG. 3) of the plug shank 6. In the secured position, the locking element 34 blocks, with locking faces 46, the latching arms 26 to prevent an opening movement radially inward in the direction of the plugging axis 14 by virtue of the fact that, according to FIG. 5, the locking element 34 engages with the locking faces 46 in the widened gap region 29a and an adjoining partial section of the gap 29. In this first embodiment, the plug shank 6 has radially projecting support faces 47 for providing support against tilting in the receiving opening 16.

In the second embodiment according to FIGS. 9 to 13, the locking element 34 firstly corresponds largely to the first embodiment according to FIGS. 1 to 7; however, it has additional elements. An activation section 48 in the form of a push button key, which is connected to the latching element 36 via an axial extension 50 of said latching element 36, is therefore arranged on the actual C-shaped locking element 34. The push button key-like activation section 48 has a surface which is oriented at a right angle to the plugging axis 14 and is arranged overall above the entire plug-in connector 1. Reference is made in this regard in particular to FIGS. 9 and 12. By means of a web 52 which is formed on the underside of the activation section 48 and is adapted to the outer contour of the plug-in connector 1 (FIG. 13), application of a pressure force on the activation section 48 is prevented from resulting in excessively large bending of the extension 50 and of the latching element 36, and therefore impedes the axial movement of the locking element where possible. In addition, the locking element 34 has two guide webs 54 which extend parallel to one another axially in the plugging-in direction 40 on the underside. These guide webs 54 increase the protection against tilting of the locking element 34. In this embodiment, two additional guide shoulders 56 are formed on the plug shank 6, said shoulders 56 being arranged offset in each case by 90° between the latching arms 26, and therefore diametrically opposite one another. The intermediate spaces which are produced as a result of this between the latching arms 26 and the guide shoulders 56 act as groove-like guides for the guide webs 54 of the locking element 34. The guide webs 54 and the guide shoulders 56 have radially outer circumferential faces which lie together on a virtual cylindrical surface with an outer diameter which is adapted to the inner diameter of the receiving opening 16 in such a way that they serve to provide tilt-free guidance of the entire plug shank 6 in the receiving opening 16. In the end regions, pointing in the release direction 24, of the guide shoulders 56, in each case a shoulder knob 58 is arranged, on which shoulder knob 58 the locking element 34 is supported in the secured position. In this context, in each case the stop knob 58 engages in a corresponding recess 60 in the C-shaped locking element 34. Furthermore, in this second embodiment, a web shoulder 62 which extends in the longitudinal direction of the conduit axis 12 may be arranged on the upside of the plug-in connector 1 in order to control locking, said web shoulder 62 having an interruption 63 for receiving the activation section 48. In this context, the embodiment is such that in the secured position of the locking element 34 the activation section 48 and the web shoulder 62 lie essentially in a common plane, said activation section 48 lying with its planar surface in said plane and said web shoulder 62 lying with its upper boundary edge in said plane. As a result, the correct secured position of the locking element 34 can easily be detected, i.e. seen and also checked. This embodiment therefore serves as a plug-in indicator.

In the third embodiment according to FIGS. 14 to 18, the locking element 34 is embodied in an annular fashion and has a plurality of (two) latching elements 36 for positioning and a plurality of (two) shoulder-shaped activation elements 42. In spite of the separate illustration in FIG. 15, this annular locking element 34 is seated in a nondetachable fashion on the plug shank 6, see FIGS. 14 and 17. In one particular method, the locking element 34 can be injection molded onto the plug shank 6 in such a way that it surrounds it by virtue of the fact that the parts are composed of various plastic materials which do not connect to one another in a materially joined fashion.

In the fourth embodiment according to FIGS. 19 to 23, the locking element 34 is embodied as a slide in an inverted U shape, which is pushed over the entire plug-in connector 1 from above. In this context, the locking element 34 engages over the plug-in connector 1 with two locking webs 64 and can be moved axially between the release position and the secured position. In its region which connects the locking webs 64, a push button key-like activation element 66 is formed. The locking webs 64 have, at their free ends pointing in the plugging-in direction, locking knobs 68 which, in the secured position 7, engage in the region of the end sections 28 of the latching arms 26 and in the gap regions 29a and in this way block the latching arms 26 (see FIGS. 19 and 22). The latching elements 36 are formed by U-shaped cutouts in the region of the locking webs 64, said latching elements 36 interacting with the latching grooves 38 on the plug shank 6 in order to position the locking element 34 in its two positions. The inner contour 70 on the underside of the activation element 66 (see FIG. 23) is matched to the upper contour of the plug-in connector in such a way that a saving in installation space is achieved by interaction of the contours. The inner contour 70 and the mating contour of the plug-in connector are matched to one another by their geometry (for example radii and/or indents) in such a way that in the plugged-in and locked state virtually all the cavities are filled in. In the embodiment according to FIGS. 19 to 23, the push button key-like activation element 66 has an upper surface which is oriented parallel to the conduit axis 12 in accordance with the profile of said conduit axis 12 which is oblique with respect to the plugging axis 14 (FIG. 22).

The embodiment variant according to FIGS. 24 to 28 differs therefrom in that the surface of the activation element 66 is oriented at right angles to the plugging axis 14 (FIG. 27). For this purpose, according to FIG. 26 the plug-in connector 1 has a recess with a corresponding mating face 72. Moreover, this embodiment according to FIGS. 24 to 28 corresponds to the fourth embodiment according to FIGS. 19 to 23.

The embodiment according to FIGS. 29 to 36, which is particularly advantageous in many respects, corresponds firstly to the embodiments according to FIGS. 1 to 7 and FIGS. 9 to 13 in many features. In this context, the plug-in connector 1 or the plug-in section 4 with the plug shank 6 is preferably embodied in such a way, radially symmetrically with respect to the plugging axis 14, that the essentially C-shaped locking element 34 can optionally be mounted on both diametrically opposite sides by radial plugging on. This means that all the components which interact with the locking element 34 are provided multiply and radially symmetrically with respect to one another (cf. in this respect FIGS. 30, 32 and 33, for example).

Specific differences and particular features of the embodiment according to FIGS. 29 to 36 compared to FIGS. 1 to 7 and 9 to 13 will be explained below.

Figure 30:
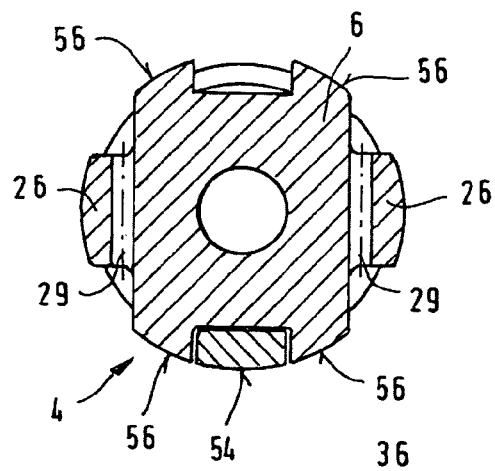
FIG. 30 is an enlarged cross section in the sectional plane XXX-XXX according to FIG. 29.

The locking element 34 has just one axial guide web 54, while the plug shank 6 has two rib-like guide shoulders 56 on each of its diametrically opposite sides. In this context, the guide web 54 of the locking element 34 engages between the guide shoulders 56 of the plug shank 6. According to FIG. 30, the outer circumferential faces, curved in a circular arc shape in cross section, of the guide web 54 and of the guide shoulders 56 are located on a virtual cylinder face whose diameter is matched to the inner diameter of the receiving opening 16 of the connector counterpart 2 in such a way that good tilt-free guidance of the entire plug-in connector 1 in the receiving opening 16 is ensured. This guidance is preferably also supported by the fact that the outer faces of the latching arms 26 according to FIG. 30 are also curved in a circular arc shape in cross section and lie on the same virtual cylinder face.

Figure 31:
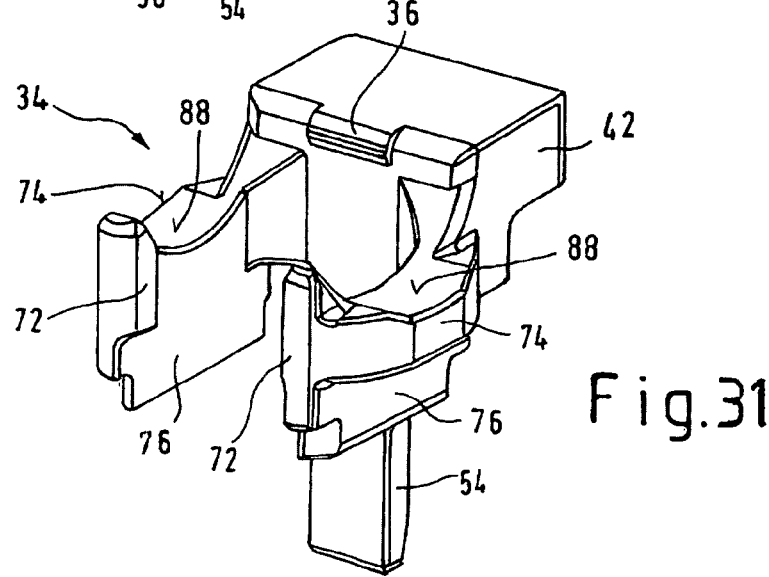
FIG. 31 is a separate, highly enlarged perspective view of the locking element.
Figure 32:
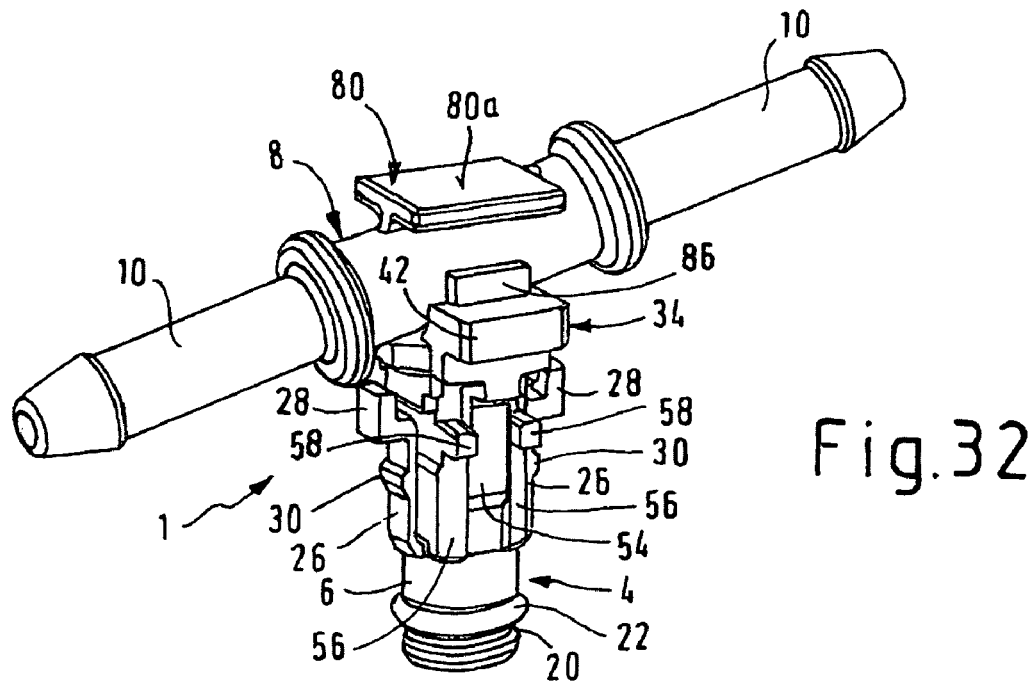
FIG. 32 is a perspective view of the plug-in part according to FIG. 29, but in the release position of the locking element.
Figure 33:
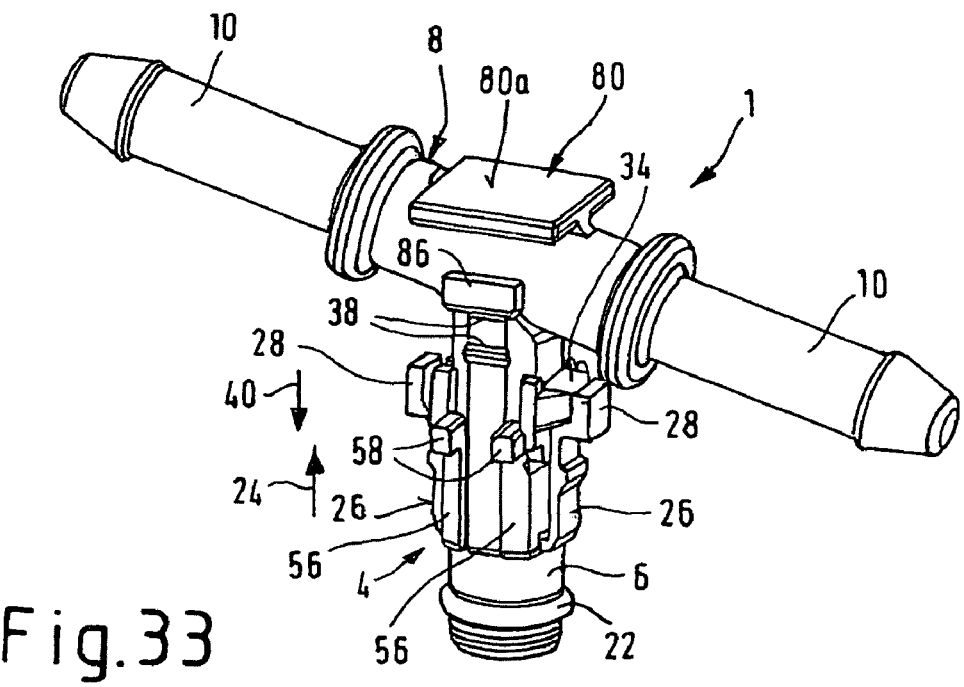
FIG. 33 is a further perspective view of the side located diametrically opposite the view according to FIG. 32, but in the secured position according to FIG. 29.

According to FIG. 31, in this embodiment of the locking element 34 the latching element 36 which secures the two axial positions by interacting with the latching grooves 38 is formed by a rib-like projection directly on the inner circumference of the C-shaped locking element 34 or of the activation element 42. In this context, the activation element 42 is advantageously mechanically reinforced by increased thickness, which is advantageous for activation by means of a tool, preferably by means of a screwdriver. At the free ends of the open sides of the C shape, the locking element 34 has latching elements 72 which point inward toward one another and with which the locking element 34 engages in a latching fashion around the plug shank 6 for securing purposes.

Figures 35, 36:
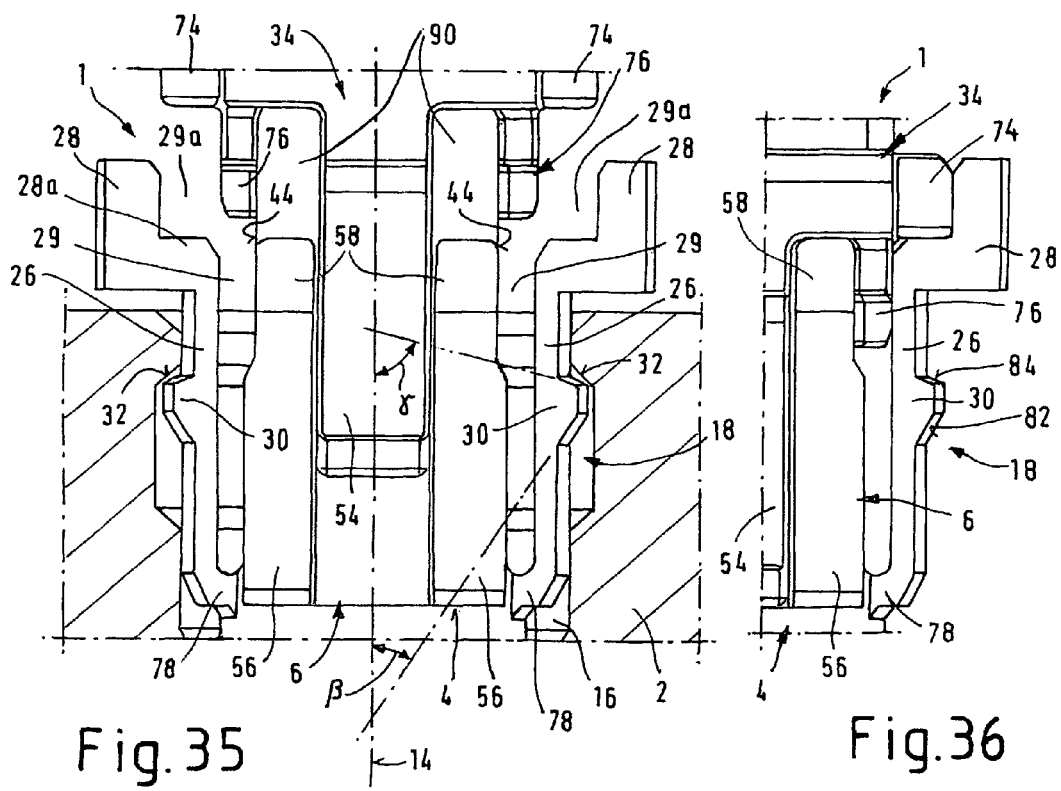
FIG. 35 shows an enlarged partial view from FIG. 34 with a connector counterpart in an axial section.
FIG. 36 shows a detail from FIG. 35 in the secured position of the locking element.

Furthermore, the locking element 34 has first bolt sections 74 for engagement in the widened gap regions 29*a* between the plug shank 6 and the end sections 28 of the latching arms 26 as well as axially extended second bolt sections 76 which, in the secured position, engage relatively far into the gap 29 in the axial direction; see for this purpose in particular FIG. 36, according to which the second bolt sections 76 extend axially to just before the region of the latching shoulders 30. In the unlocked release position (FIG. 35), the latching arms 26 form a type of "projecting arms" which are freely elastically moveable in the radial direction. It is advantageous here if each latching arm 26 is integrally connected to the plug shank 6 via a radial connecting section 78 and in the process each connecting section 78 has a wall thickness which corresponds approximately to the wall thickness or the radial thickness of the latching arm 26. As a result, the connecting section 78 acts similarly to a film hinge, which leads to a reduced radial force for radially moving the latching arms 26. Nevertheless, in the secured position (FIG. 36), a high degree of stability against release is ensured by virtue of the fact that each latching arm 26 is clamped in radially without play at both ends, i.e. on both sides of the latching shoulder 30.

In a further advantageous embodiment, the plug-in connector 1 has, on the (upper) side of the conduit connection section 8 lying opposite the plug-in section 4, an, in particular, plate-shaped or disk-shaped pressure element 80 with a planar surface 80*a* which is oriented transversely, in particular at a right angle, with respect to the plugging axis 14. The pressure element 80 is preferably arranged in such a way that the plugging axis 14 runs centrally through the pressure element 80 or its surface 80*a*. A plug-in force can most satisfactorily be applied manually by means of the pressure element 80. In addition, the pressure element 80 can also serve as a carrier for a mark or characterizing label.

As has also already been mentioned above, the plug-in force which is to be applied for the purpose of plugging in is smaller than the release force which is necessary for pulling out. For this purpose, the latching shoulder 30 of each latching arm 26 preferably has, in structural terms, a first oblique face 82 which points in the plugging-in direction (arrow 40 in FIG. 34) and a second oblique face 84, opposite the first, (see FIG. 36) which points in the release direction (arrow 24 in FIG. 34). As is shown in FIG. 35, in this context the first oblique faces 82 enclose, with the plugging axis 14, an acute, relatively small (flat) angle β, while the angle γ between the two oblique faces 84 and the plugging axis 14 is greater. In the illustrated example, the angle β is approximately 25° to 35°, in particular approximately 30°, and the angle γ is approximately 70° to 80°. Here, the latching step 32 is preferably also constructed within the connector counterpart 2 as an oblique face in such a way that in the release position of the locking element 34 the plug-in connector 1 can be released in a frictionally locking fashion by simply pulling it out by virtue of the fact that the latching shoulders 30 are moved radially inward over the respective oblique faces.

Furthermore, it is advantageous if the plug-in connector 1 has, in the junction region between the plug-in section 4 and the conduit connection section 8, a stop element 86 (or one on each diametrically opposite side) against which the locking element 34 moves axially into abutment in its upper release position. The stop element 86 therefore forms an end stop for upwardly limiting the movement of the locking element 34 in the release direction. As a result, a release force can advantageously also be applied to the plug-in connector 1 via the locking element 34 by means of a lever-like tool (screwdriver).

Figure 34:
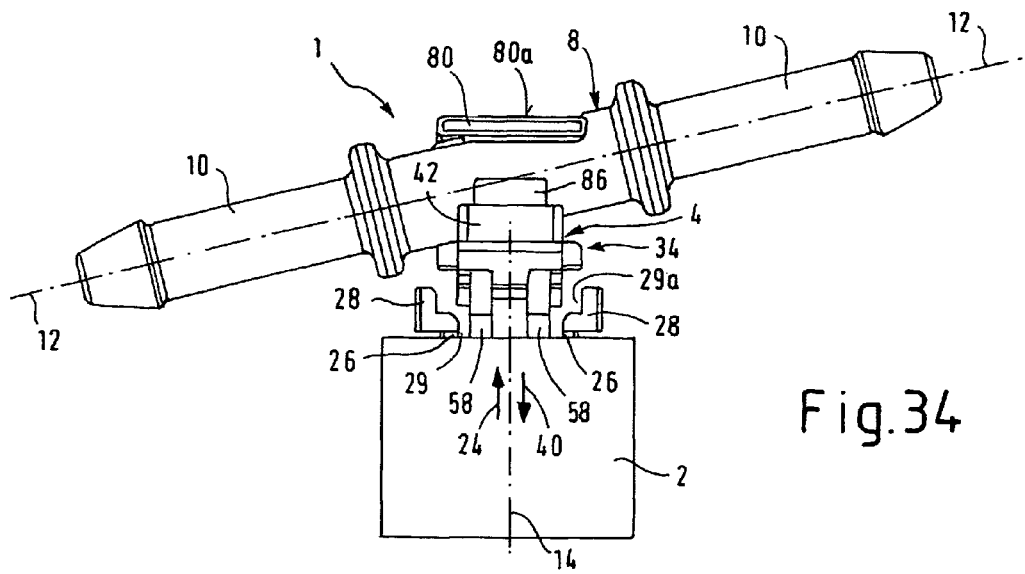
FIG. 34 is a side view of the plug-in part as in FIG. 29, but in a state in which it is plugged into a connector counterpart and in the release position of the locking element.

In order to downwardly limit the axial movement of the locking element 34 in the plugging-in direction in the secured position (see in particular FIG. 36), the plug-in connector 1 has in each case two stop knobs 58—in turn preferably symmetrical on the two diametrically opposite sides—on the plug shank 6, which stop knobs 58 advantageously also simultaneously serve, according to FIG. 34, as stops for limiting the plugging in of the plug shank 6 by bearing on the connector counterpart 2. In this context, the stop knobs 58 are preferably dimensioned in such a way that in the plug-in position according to FIG. 34 the latching arms 26 are axially free of force in the region of the latching shoulders 30 (cf. in this respect also FIG. 35 according to which the latching shoulders 30 are slightly spaced apart from the latching step 32 in the axial direction). This is a particular advantage especially in the case of a partial vacuum of the medium or media.

In order to obtain a particularly compact design with the smallest possible height protruding axially beyond the connector counterpart 2 the upper side of the locking element 34 is matched to the underside, adjoining the plug-in section 4, of the conduit connection section 8 and the conduit outlet 10 in such a way that in its release position the locking element 34 holds or surrounds the conduit connection section 8 in certain areas. Specifically, this is achieved by virtue of the fact that according to FIG. 31 the locking element 34 has, on its upper side, concave depressions 88 as a negative contour adapted to the circular cross-sectional contour of the conduit connection section 8 or of the conduit outlet 10. At least one of these depressions 88 given an oblique position of the conduit connection section 8, (cf. the angle α in FIG. 29), fits tightly against the conduit connection section 8 in the release position (see FIGS. 32 and 34).

In order to permit the locking element 34 to be easily fitted or latched radially onto the plug shank 6, the plug shank 6 expediently has, on its circumference, guide faces 90 which, for example, have an oblique or circular arc-shaped cross section (see FIGS. 29 and 35) such that when said locking element 34 is fitted on radially the free sections of the C-shaped locking element 34 come to bear with the latching elements 72 on the guide faces 90 and as a result are spread elastically until ultimately the latching elements 72 engage in a frictionally locking and latching fashion around the plug shank 6.

To conclude it is to be noted that the plug-in connector according to the invention can be manufactured with a very small spatial shape in the embodiment according to the invention. For example, it can be configured for an inner diameter of the receiving opening 16 of the order of magnitude of approximately 8 mm. In this context the plug shank 6 has a plugging-in length of approximately 12 mm, measured from the free plugging-in end up to the support faces of the stop knobs 58.

One preferred use of the plug-in connector is for connecting at least one fuel return flow line or leakage oil line in a fuel injection system of an internal combustion engine, in particular in what is referred to as a common rail system of a diesel engine. Owing to the increasing conduit density in such engines, the installation space which is available for plug-in connections is becoming smaller and smaller in the injector region of the cylinder head. As a result of the possibly very small design, in particular the plugging-in length, of the plug-in connector according to the invention, the latter is also very well suited for such applications.

The invention is not restricted to the illustrated and described exemplary embodiments but rather also comprises all the embodiments with the same effect within the sense of the invention. In addition, the invention has hitherto also not yet been restricted to a feature combination which is defined in claim 1 but rather can also be defined by any desired other combination of specific features of all the individual features which are disclosed in their entirety. This means that basically virtually any individual feature of claim 1 can be omitted or replaced by at least one individual feature which is disclosed at another point in the application. In this respect, claim 1 is merely to be understood as a first attempt at formulation of an invention.

What is claimed is:

1. A plug-in connector (1) for media conduits, comprising: a plug-in part (4) which can be plugged with a plug shank (6) in a seal-forming fashion into a receiving opening (16) of a connector counterpart (2), and can be releasably placed into a locked position, using latching means (18), to prevent the plug-in part from being pulled out from the receiving opening wherein the latching means (18) is composed of at least two latching arms (26), of the plug-in part (4), which latching arms (26) extend approximately parallel to a plugging axis (14) in the release direction (24) and are biased in a spring elastic fashion in the radial direction, wherein, in the plugged-in state, the latching arms (26) each engage in a latching and positively or frictionally locking fashion behind a latching step (32) which is provided within the receiving opening (16) of the connector counterpart (2), wherein said plug-in-part (4) together with the latching arms (26) being embodied as an integral, monolithic part, the connector (1) further comprising a locking element (34) which is moveably connected to the plug-in part (4) and in a secured position it blocks the latching means (18) to prevent release of the latching means, and in a release position the locking element releases the latching means (18) for a release movement which cancels the locked position, wherein said plug shank (6), in the areas between the latching arms (26), comprises radially projecting support faces (47) or guide shoulders (56) for providing support against the tilting of the plug shank (6) in the receiving opening (16).

2. The plug-in connector as claimed in claim 1, wherein the latching means (18) is composed of two latching arms (26), located diametrically opposite one another.

3. The plug-in connector as claimed in claim 1, wherein the locking element (34) is held on the plug-in part (4) so as to be moveable, in the axial direction, in such a way that in the secured position it blocks the latching arms (26) to prevent a release movement which is directed radially inward, and in the release position it releases the latching arms (26) for such a release movement.

4. The plug-in connector as claimed in claim 1, wherein the locking element (34) is secured in the secured position or in the release position, in a frictionally locking and latching fashion in relation to the plug-in part (4).

5. The plug-in connector as claimed in claim 1, wherein each latching arm (26) has a radial latching shoulder (30) which, in interaction with the connector counterpart (2), is designed in such a way that a release force which is to be applied to bring about release by pulling out of the receiving opening (16) is greater than a plug-in force which is necessary for plugging in.

6. The plug-in connector as claimed in claim 1, wherein the plug-in part (4) is connected in one piece to a conduit connection section (8), wherein the conduit connection section (8) has at least one conduit outlet (10) with a conduit axis (12) which is oriented transversely with respect to a plugging axis (14) of the plug shank (6) or on the same axis.

7. The plug-in connector as claimed in claim 1, characterized in that the plug-in part (4) is of radially symmetrical design with respect to its outer contour which interacts with the locking element (34) in such a way that the locking element (34) can optionally be connected to the plug-in part (4) in various relative positions.

8. The plug-in connector as claimed in claim 1, wherein the locking element (34) is formed essentially in a C shape in such a way that it can be fitted onto the plug shank (6) in the radial direction in a frictionally locking and latching fashion.

9. The plug-in connector as claimed in claim 1, wherein the locking element (34) has at least one axial guide web (54), and the plug shank (6) has at least one axial, web-like guide shoulder (56) in such a way that tilt-free guidance of the locking element (34) on the plug shank (6) and of the plug shank (6) in the receiving opening (16) is ensured.

10. The plug-in connector as claimed in claim 9, wherein the guide web (54, the guide shoulder (56) and the latching arm (26) have outer guide faces adapted to the circular internal cross-sectional contour of the receiving opening (16).

11. The plug-in connector as claimed in claim 1, wherein in its release position or in its secured position the locking element (34) moves axially into abutment against an end stop.

12. The plug-in connector as claimed in claim 1, wherein the locking element (34) has a radially protruding activation element (42).

13. The plug-in connector as claimed in claim 6, wherein the conduit connection section (8) has, on its side lying opposite the plug shank (6), a plate-like pressure element (80) with a surface (80*a*) which is oriented perpendicularly with respect to the plugging axis (14).

14. The plug-in connector as claimed in claim 2, wherein the secured position the locking element (34) engages with bolt sections (74, 76) in gaps (29, 29*a*) between the plug shank (6) and each latching arm (26) in such a way that each latching arm (26) is secured radially without play in its free end region.

15. The plug-in connector as claimed in claim 2, wherein the plug-in part (4) has outer stop elements (58) for limiting the plugging in by bearing on the connector counterpart (2), wherein the latching arms (26) are preferably axially free of force in the support position.

16. The plug-in connector as claimed in claim 6, wherein the locking element (34) has, on its side facing the conduit connection section (8), a negative contour which is adapted to the adjoining contour of the conduit connection section (8).

17. The plug-in connector as claimed in claim 1, characterized in that the locking element (34) is embodied in an annular fashion and is seated in a nondetachable fashion on the plug shank (6) so as to surround the plug shank coaxially.

18. The plug-in connector as claimed in claim 1, wherein the locking element (34) is formed as an essentially U-shaped slide which engages over the plug-in part (4) axially from its side pointing in the release direction.

* * * * *